UNITED STATES PATENT OFFICE.

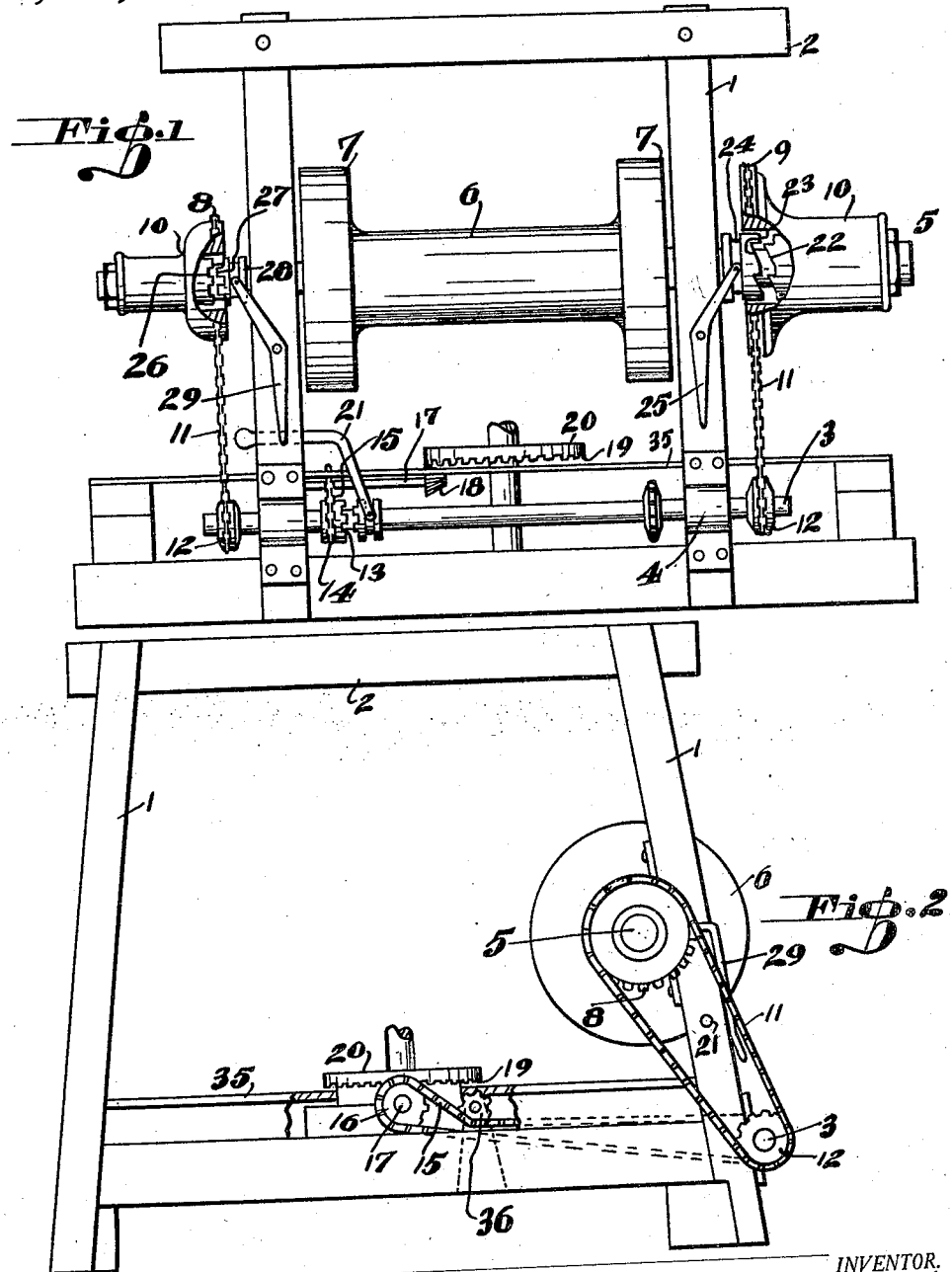

HOMER T. WHITTEKIN, OF ALHAMBRA, CALIFORNIA.

POWER TRANSMISSION FOR ROTARY DRILLS.

1,405,241.   Specification of Letters Patent.   Patented Jan. 31, 1922.

Application filed April 29, 1920. Serial No. 377,567.

*To all whom it may concern:*

Be it known that I, HOMER T. WHITTEKIN, a citizen of the United States, residing at Alhambra, in the county of Los Angeles and State of California, have invented new and useful Improvements in Power Transmission for Rotary Drills, of which the following is a specification.

This invention is a power transmission for rotary drills and has for its object the provision of a construction wherein the line shaft is positioned at the base of the rig of the drill and below the draw-works of the drill so as to produce an extremely stable construction and one in which the liability of injury to the parts is avoided.

It is the further object of the invention to provide an improved two-speed clutch mechanism between the line shaft and the draw-works of the drill.

The invention will be readily understood from the following description of the accompanying drawings, in which:

Figure 1 is a front elevation of a power transmission constructed in accordance with the invention.

Fig. 2 is a side elevation of the same.

The improved transmission is supported from the uprights 1 of the drilling rig, these uprights being connected by the usual cross bars 2. The line shaft 3 of the transmission is journaled in bearings 4 adjacent the lower ends of the uprights 1, so that the line shaft is positioned adjacent the base of the rig. The drum shaft 5 is journaled upon the uprights 1 so as to be positioned above the line shaft of the transmission. The usual drum 6 is fixed upon the drum shaft and is provided with the usual wheels 7 arranged to receive the usual brake bands which are not shown. Sprocket wheels 8 and 9 are loosely mounted upon the respective ends of the drum shaft, these sprocket wheels being preferably formed upon shells 10 which form one face of the clutch connections between the respective sprocket wheels and clutch members fixed upon the drum shaft. Sprocket chains 11 extend over the respective sprockets 8 and 9 and over sprocket wheels 12 fixed upon the line shaft. The two sprockets 12 are, preferably, of the same size and one of the sprockets upon the drum shaft, the sprocket 9, is larger than the sprocket 8 so that different speeds may be imparted to the drum shaft by engaging either the sprocket 8 or the sprocket 9 with the drum shaft. The line shaft of the transmission is preferably provided with a clutch mechanism 13 for optionally rotating a sprocket 14, this sprocket being connected by a sprocket chain 15 with a sprocket 16 upon the shaft 17 carrying the pinion 18 arranged to mesh with the gear 19 of the rotary table 20 of the drill for rotating the latter.

The clutch 13 may be controlled by a usual lever 21. The clutch conections between the sprockets 8 and 9 and the drum shaft are preferably so arranged that when the low speed sprocket 9 is connected to the drum shaft for starting the drum, and the sprocket 8 is subsequently connected to the drum shaft for increasing the speed thereof, the sprocket 9 will be automatically disengaged from the drum shaft. As an instance of this arrangement, the shell 10 of the sprocket 9 may be provided with a clutch face having ratchet teeth 22 arranged to engage co-operating teeth 23 upon a clutch member 24 slidably fixed to the drum shaft and arranged to be moved into and out of clutching engagement with the sprocket by means of a lever 25. The shell of sprocket 8 is provided with a clutch face, preferably, having square clutch teeth 26 arranged to be engaged by the teeth 27 of a clutch member 28 slidably fixed upon the drum shaft and moved into or out of clutching engagement by a lever 29. By this arrangement it will be seen that when the drum shaft is being rotated at low speed by means of the sprocket 9 and the sprocket 8 is subsequently engaged by the drum shaft through its clutch connection the increased speed of rotation of the drum shaft will cause the ratchet tooth clutch connection of the sprocket 9 with the drum shaft to disengage and thereby permit the sprocket 9 to rotate free from the drum shaft.

It will be observed that the line shaft 3 being arranged at the base of the rig makes it possible to position said line shaft and the actuating mechanism for the rotary table 20 as well as the sprocket chain connecting said actuating mechanism with the line shaft beneath the flooring 35 of the drilling rig. The sprocket chain 15 may be provided with an idler sprocket 36 which is also positioned beneath flooring 35. By this construction it will be observed that a great number of the movable parts of the power transmission, which in the usual construction are arranged upon the uprights of the drilling rig where they are in the way of the operators of the drilling rig, are in my improved construction positioned beneath the flooring 35 where they will be out of the way of the operators.

It will be apparent that various changes may be made in the construction as thus described without departing from the spirit of the invention.

What is claimed is:

1. The combination in a drilling rig of a line shaft, a drum shaft, sprockets loose upon said drum shaft, driving connections for said sprockets from said line shaft arranged to rotate said sprockets at different speeds, and clutch connections between the respective sprockets and the drum shaft, the clutch connection for the sprocket rotating at less speed being a ratchet toothed connection arranged whereby engagement of the clutch connection of the other sprocket causing greater speed of rotation of the drum shaft will cause disengagement of said ratchet toothed clutch connection.

2. The combination in a drilling rig of a rotary table, a line shaft, a clutch connection between said table and shaft, a drum shaft, sprockets loose upon said drum shaft, driving connections for said sprockets from said line shaft, arranged to rotate said sprockets at different speeds, and clutch connections between the respective sprockets and the drum shaft, the clutch connection for the sprocket rotating at less speed being a ratchet toothed connection arranged whereby engagement of the clutch connection of the other sprocket, causing greater speed of rotation of the drum shaft, will cause disengagement of said ratchet toothed clutch connection.

In testimony whereof I have signed my name to this specification.

HOMER T. WHITTEKIN.